United States Patent [19]

Füldner et al.

[11] Patent Number: 5,136,568
[45] Date of Patent: Aug. 4, 1992

[54] TRACKING CIRCUIT FOR GUIDING A BEAM OF LIGHT ALONG DATA TRACKS OF A RECORDED MEDIUM

[75] Inventors: Friedrich Füldner, Villingen-Schwenningen; Arthur Kurz, Karlsruhe; Dieter Baas, Kehl, all of Fed. Rep. of Germany

[73] Assignee: Deutsche Thomson-Brandt GmbH, Hanover, Fed. Rep. of Germany

[21] Appl. No.: 708,072

[22] Filed: May 22, 1991

Related U.S. Application Data

[63] Continuation of Ser. No. 131,770, Dec. 11, 1987, abandoned.

[30] Foreign Application Priority Data

Dec. 15, 1986 [DE] Fed. Rep. of Germany ....... 3642763

[51] Int. Cl.$^5$ .............................................. G11B 7/09
[52] U.S. Cl. ............................ 369/44.25; 369/44.29; 369/44.32; 369/44.34; 369/54
[58] Field of Search ............ 369/44.25, 44.27, 44.29, 369/44.32, 44.34, 44.35, 54, 55, 100, 124; 250/201.1, 201.5, 202

[56] References Cited

U.S. PATENT DOCUMENTS

| | | | |
|---|---|---|---|
| 4,663,751 | 5/1987 | Kaku et al. | 369/109 X |
| 4,707,816 | 11/1987 | Yonezawa et al. | 369/44 |
| 4,730,294 | 3/1988 | Funada | 369/54 X |
| 4,745,588 | 5/1988 | Yoshikawa et al. | 369/44 X |
| 4,748,609 | 5/1988 | Yonezawa et al. | 369/124 X |
| 4,755,977 | 7/1988 | Abed | 369/44 X |
| 4,773,052 | 9/1988 | Sugiura et al. | 369/44 X |
| 4,775,966 | 10/1988 | Miura et al. | 369/44 |
| 4,779,255 | 10/1988 | Sugiyama et al. | 250/201 X |
| 4,785,442 | 11/1988 | Ohtake et al. | 369/44 |
| 4,787,076 | 11/1988 | Deguchi et al. | 369/44 X |
| 4,794,244 | 12/1988 | Kimura | 369/44 X |
| 4,841,514 | 6/1989 | Tsuboi et al. | 369/44 X |

FOREIGN PATENT DOCUMENTS 0225258 6/1987 European Pat. Off. .

Primary Examiner—Roy N. Envall, Jr.
Assistant Examiner—W. R. Young
Attorney, Agent, or Firm—Max Fogiel

[57] ABSTRACT

A tracking circuit for guiding a beam of light along data tracks of a recorded medium as compact disks and video disks, in which the recorded medium reflects a light beam onto a photodetector. The photodetector has an output voltage that is applied to a servo through a variable-gain amplifier. A compensation voltage is superimposed over the output voltage from the photodetector during the open state of the circuit to compensate off said voltages. This compensation voltage is varied until the sum of the output voltage from the photodetector and the compensation voltage attains a predetermined value. Thereafter the circuit is closed.

4 Claims, 3 Drawing Sheets

TRACKING CIRCUIT FOR GUIDING A BEAM OF LIGHT ALONG DATA TRACKS OF A RECORDED MEDIUM

The present application is a continuation of the parent application Ser. No. 131,770 filed Dec. 11, 1987, now abandoned.

BACKGROUND OF THE INVENTION

The invention concerns a tracking circuit for guiding a beam of light along the data tracks of a recorded medium that reflects the beam to a photodetector, the output voltage of which is supplied to a servo component through a variable-gain amplifier.

Tracking circuits of this type are employed for example in the optical scanning systems of compact-disk players for guiding beam of light that reads the information along the spiral data tracks of the compact disk.

Optical scanning systems for compact-disk players, which are frequently called optical pick-ups, are described and illustrated on pages 209 to 215 of Electronic Components and Applications, Vol. 6, No. 4, 1984.

The beam of light, which is emitted by a laser diode, is focused on the compact disk by lenses and reflected thence onto a photodetector, from the output signals of which not only the data stored on the disk but also the actual values for the tracking and focusing circuits are obtained. The focusing circuit focuses the beam of light emitted by the laser diode on the disk, and the tracking circuit guides it along the tracks on the disk. The actual value of the tracking circuit, which is called the radial-tracking error in the aforesaid reference, is supplied to the input terminal of a variable-gain amplifier, the output terminal of which is connected to a servo component. The servo component, which is usually called a radial drive, moves the optical scanning system radially over the disk, so that the beam of light emitted by the laser diode can be precisely guided along the data tracks and information stored on the disk can be read out.

SUMMARY OF THE INVENTION

The photodetector in the optical scanning system illustrated in FIG. 2b on page 213, consists of six square elements A, B, C, D, E, and F. Elements A, B, C, and D are arrayed in a square, and elements E and F are at two opposite corners thereof.

The actual value—radial tracking error F-E—is constructed in a differential amplifier from the output voltages of elements E and F. Since, however, elements E and F have different parameters as the result of manufacturing tolerances, and since both the differential amplifier and the variable-gain amplifier are actual and not ideal components, the tracking circuit has an offset voltage. Unless this offset voltage can be compensated, the tracking circuit will operate unsymmetrically. It is, however, desirable for the tracking circuit to operate symmetrically, meaning that its control range must be symmetrical. The variable-gain amplifier must accordingly be compensated during the manufacture of the compact-disk player by manually adjusting a potentiometer to allow the circuit to operate symmetrically.

There is, however, always a drawback to manual adjustment, which demands particular care and the use of a metering instrument. Another drawback does not become evident until later, when the parameters of the photodetector, the differential amplifier, and the variable-gain amplifier change due to aging. Temperature changes also lead to different offset voltages. The potentiometer that compensates the variable-gain amplifier must accordingly be constantly readjusted.

The object of the invention is accordingly to improve a tracking circuit for the optical scanning system of a compact-disk player to the extent that offset voltages can be rapidly and automatically compensated.

This object is attained in accordance with the invention in that, in order to compensate offset voltages, a compensation voltage is superimposed over the photodetector output voltage, while the circuit is open, and is varied until the sum of the output voltage and the compensation voltage assumes a prescribed value and in that the circuit is then closed.

DESCRIPTION OF THE PREFERRED EMBODIMENTS

Figure 1:
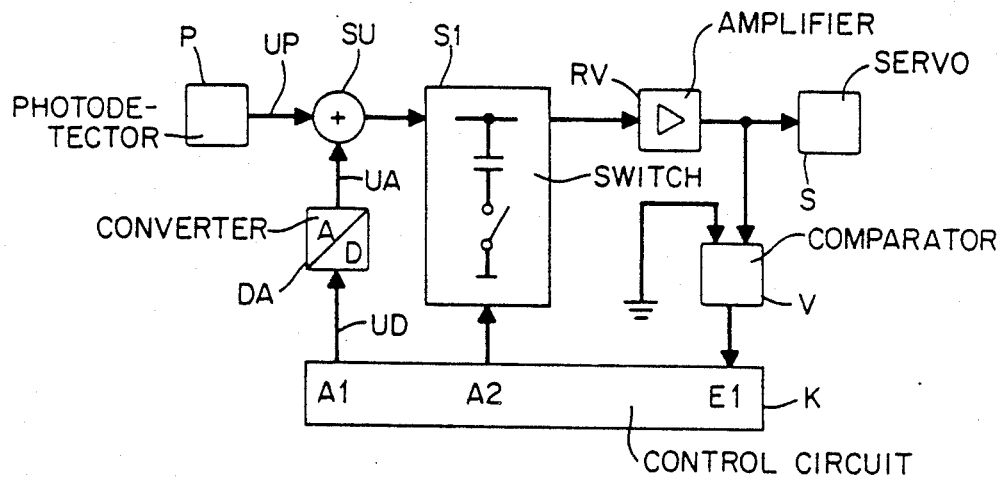
FIG. 1 is a schematic diagram and shows the essential elements of the present invention.

The output terminal of the photodetector P illustrated in FIG. 1 is connected to the first input terminal of a summation point SU, the output terminal of which is connected to the input terminal of a variable switch S1. The output teminal of variable switch S1 is connected to the input terminal of a variable-gain amplifier RV the output terminal of which is connected to the input terminal of a servo component S and to the first input terminal of a comparator V. The second input terminal of comparator V is connected to reference potential, and its output terminal is connected to the input terminal E1 of a control circuit K, the first output terminal A1 of which is connected to the input terminal of a digital-to-analog converter DA and the second output terminal A2 of which is connected to the control input terminal of variable switch S1. The output terminal of digital-to-analog converter DA is connected to the second input terminal of summation point SU.

At the commencement of automatic offset-voltage compensation, control circuit K opens the control circuit through variable switch S1. This can occur as illustrated in FIG. 1 for example by alternating-voltage connection of the output terminal of summation point SU to reference potential by means of a capacitor. The compact disk is now spinning, and photodetector P will, due to the information stored on the data tracks, release a high-frequency voltage UP, which will be short-circuited to reference potential through the capacitor. Control circuit K releases a digital voltage UD at its first output terminal A1, which, due to digital-to-analog converter DA, is added in the form of an analog compensation voltage UA in summation point SU to the output voltage of photodetector P. Amplified by variable-gain amplifier RV, the sum of the two voltages is supplied to the first input terminal of comparator V. Control circuit K now varies the voltage at its first output terminal A1 until comparator V emits a signal at its output terminal, informing circuit K that the voltage at the output terminal of variable—gain amplifier RV—the amplified sum of the analog compensation voltage and the output voltage of photodetector P, is zero. Control circuit K now maintains that value of the voltage at its first output terminal A1 at which the voltage at the output terminal of variable-gain amplifier RV is zero and, by means of a signal at its second output terminal A2, closes the control circuit by alternating-voltage separation of the output terminal of summation point SU again. The voltage at the output terminal of digital-to-analog converter DA is now constantly supplied in the form of a compensation voltage to the input terminal of variable-gain amplifier RV.

Since the signal at the output terminal of comparator V can assume one of two states, control circuit K will already know at the commencement of the compensation process what polarity the offset voltage that is to be compensated has. If the polarity of the offset voltage is negative, control circuit K will release a compensation voltage with a positive polarity. If the offset voltage is positive on the other hand, it will release a negative compensation voltage. Since control circuit K commences the compensation process with the correct polarity, compensation will take only half as long. The flow diagram for this arrangement is shown in FIG. 6.

The offset voltage can for example be compensated every time the player is turned on, every time a disk is changed, or during the pauses between pieces of music on the disk. Manual compensation will no longer be necessary, and changes in the components and drifts in their parameters due to temperature fluctuations will be automatically compensated.

Figure 2:
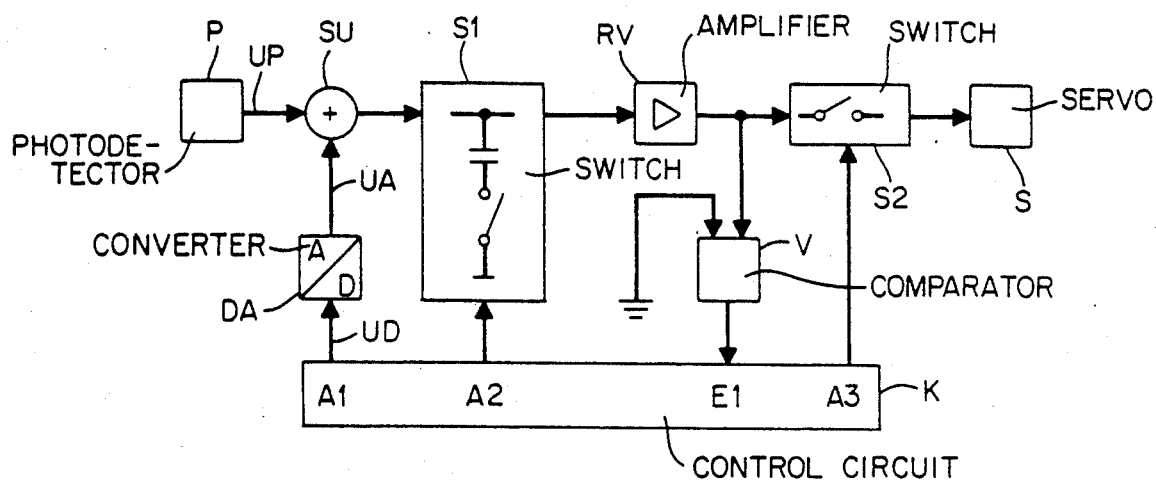
FIG. 2 is a schematic diagram of another embodiment of the invention.

FIG. 2 illustrates a development of the embodiment illustrated in FIG. 1, differing in that another variable switch S2 is positioned between the output terminal of variable-gain amplifier RV and servo component S. The control input terminal of second variable switch S2 is connected to the third output terminal A3 of control circuit K. Second variable switch S2 is opened by control circuit K during the compensation process.

The advantage of this measure is that the focusing circuit will focus the beam of light more precisely on the disk when the player is turned on. Without second variable switch S2, it is reasonable to compensate the tracking circuit first, focus the beam of light emitted by the laser diode on the disk by means of the focusing circuit, and recompensate the tracking circuit in that the focussing can vary the offset voltage UP at the output terminal of photodetector P. The flow diagram is given in FIG. 5

Figure 3:
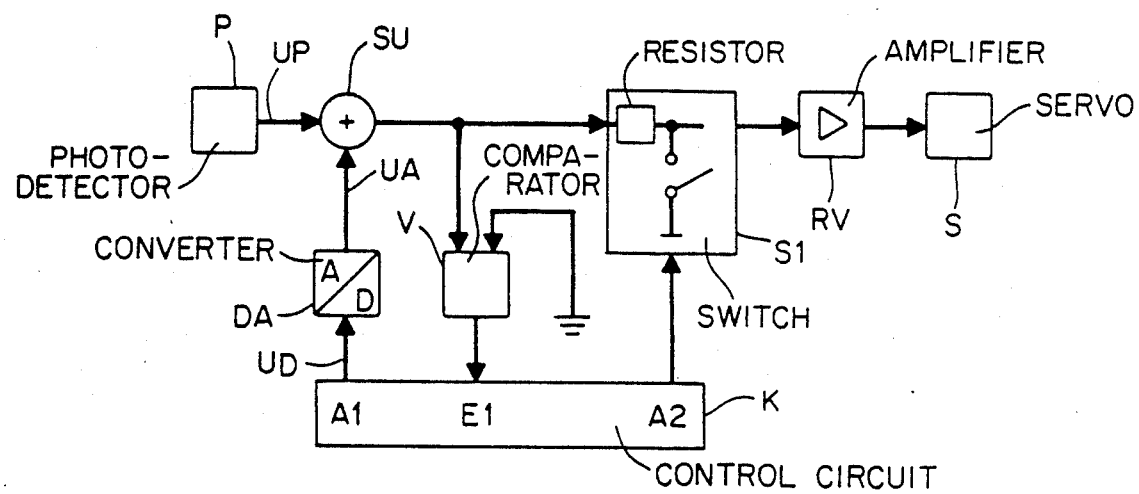
FIG. 3 is a schematic diagram of a still further embodiment according to the present invention.

FIG. 3 and the flow diagram of FIG. 7 illustrate an embodiment of the invention that differs from the one in FIG. 1 in that the first input terminal of comparator V is connected not to the output terminal of variable-gain amplifier RV but to the output terminal of summation point SU. During the compensation process, which occurs as with the first two embodiments, the input terminal of variable-gain amplifier RV is connected to reference potential by variable switch S1.

Figure 4:
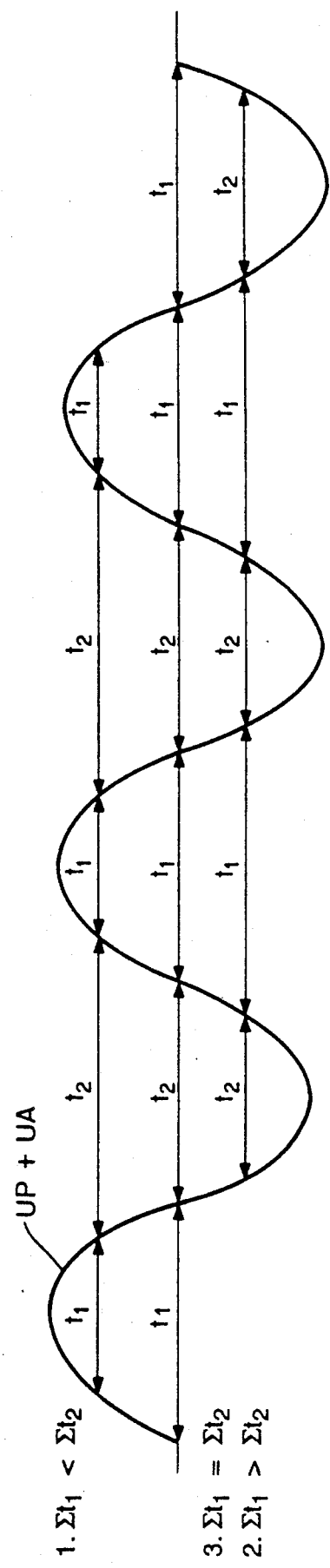
FIG. 4 is a graph corresponding to the arrangement of FIG. 3.

Since, the input terminal of variable switch S1 is highly ohmic, the output terminal of summation point SU and the input terminal of variable-gain amplifier RV will be disconnected. While the disk is spinning, the voltage at the output terminal of summation point SU will be sinusoidal (see FIG. 4). Whenever this voltage exceeds or drops below the reference voltage, which is at the second input terminal of comparator V, the comparator will vary its output signal. Control circuit K will now integrate the times during which the voltage at the output terminal of summation point SU is lower than the reference voltage and the times during which the voltage at the output terminal of summation point SU is higher than the reference voltage at the second input terminal of comparator V. Control circuit K will vary the digital voltage at its first output terminal A1 until the voltage at the output terminal of summation point SU is on the average just as far above as it is below the reference voltage at the second input terminal of comparator V, at which time the offset voltage UP of photodetector P is compensated.

The offset voltage of variable-gain amplifier RV is of course not compensated. This situation, however, is no longer a drawback because the offset voltage of variable-gain amplifier RV is negligibly small in comparison with the offset voltage of photodetector P.

What is claimed is:

1. A tracking circuit for guiding a beam of light along data tracks of a recorded medium, comprising: a light beam source; a recorded medium with data tracks and a photodetector, said recorded medium reflecting a light beam onto said photodetector; servo means; a variable-gain amplifier connected between said photodetector and said servo means, said photodetector having an output voltage supplied to said servo means through said amplifier; means for superimposing a compensation voltage over said output voltage from said photodetector; means for varying said compensation voltage during a compensation interval until the low-frequency component of the sum of said output voltage from said photodetector and said compensation voltage attains a predetermined value.

2. A tracking circuit as defined in claim 1, including summation means having one input connected to said photodetector for receiving said output voltage from said photodetector; control circuit means; digital-to-analog converter means connected between one output terminal of said control circuit means and another input of said summation means, said summation means having an output; variable switch means connected between said output of said summation means and ground potential; said amplifier having an output connected to an input of said servo means; said amplifier having an input connected to the output of said summation means; comparator means having a first input connected to the output of said amplifier; a source of reference voltage connected to a second input of said comparator means; said comparator means having an output connected to an input of said control circuit means; said control circuit means having a first output supplied to said digital-to-analog converter means, said control circuit means having a second output supplied to a control input of said variable switch means.

3. A tracking circuit as defined in claim 2, including additional variable switch means connected between said variable-gain amplifier and said servo means; said control circuit means having a third output supplied to a control input of said additional variable switch means.

4. A tracking circuit as defined in claim 1, including summation means having a first input connected to said photodetector for receiving said output voltage from said photodetector, said summation means having a second input; control circuit means having a first output and a second output; digital-to-analog converter means having an input connected to said first output of said control circuit means; said digital-to-analog converter means having an output connected to said second input of said summation means, said summation means having an output; comparator means having a first input connected to said output of said summation means; a source of reference voltage connected to a second input of said comparator means; said comparator means having an output connected to an input of said control circuit means; variable switch means having a control input connected to said second output of said control circuit means; said variable switch means having an input connected to said output of said summation means; said variable switch means having an output connected to ground potential; said amplifier having an output connected in an input of said servo means and having an input connected to the output of said summation means.

* * * * *